(12) United States Patent
Hyytiainen

(10) Patent No.: US 8,854,296 B2
(45) Date of Patent: Oct. 7, 2014

(54) ELECTRONIC DEVICE WIRELESS DISPLAY

(75) Inventor: Ilkka Antero Hyytiainen, Espoo (FI)

(73) Assignee: Nokia Corporation, Espoo (FI)

( * ) Notice: Subject to any disclaimer, the term of this patent is extended or adjusted under 35 U.S.C. 154(b) by 1659 days.

(21) Appl. No.: 12/221,331

(22) Filed: Aug. 1, 2008

(65) Prior Publication Data

US 2010/0026622 A1 Feb. 4, 2010

(51) Int. Cl.
*G09G 3/34* (2006.01)

(52) U.S. Cl.
USPC ............................................. 345/107; 345/92

(58) Field of Classification Search
USPC ........ 345/89–96, 104–107, 204–215; 455/24, 455/25, 575.1–575.7; 343/702, 906
See application file for complete search history.

(56) References Cited

U.S. PATENT DOCUMENTS

| | | | |
|---|---|---|---|
| 5,828,341 A | 10/1998 | Delamater | 343/702 |
| 7,102,587 B2 | 9/2006 | Benton et al. | 343/873 |
| 7,751,860 B2 * | 7/2010 | Symons et al. | 455/575.3 |
| 2005/0275600 A1 * | 12/2005 | Benton et al. | 343/873 |
| 2008/0039009 A1 | 2/2008 | Symons et al. | 455/3.06 |

FOREIGN PATENT DOCUMENTS

EP 1686026 A1 8/2006

OTHER PUBLICATIONS

Won, Grace, "Hitachi's handset 'W61H' adopting 2.7-inch e-ink display 'Silhouette screen'", Jan. 29, 2008, 2 pages, All Visual Internet News of Goods, internet document retrieved on Apr. 30, 2008 from http://aving.net/common/pop_print.asp?c_num=71481 &Lng_Num=2.
Cutlackon, Gary, "Hitachi's e-ink 'Silhouette Screen' W61H (it's just a kind of mobile phone)", Jan. 29, 2008, 3 pages, Tech Digest, internet document retrieved on Nov. 16, 2011 from http://www.techdigest.tv/2008/01/hitachis_eink_s.html.
"Electronic Paper", Jul. 27, 2008, 5 pages, Wikipedia, internet document retrieved from http://en.wikipedia.org/wiki/Electronic_paper.
"E Ink", Apr. 27, 2008, 1 page, Wikipedia, internet document retrieved from http://en.wikipedia.org/wiki/E_Ink.
"Electronic ink", 2005, 1 page, internet document retrieved May 2008 from http://www.eink.com/technology/howitworks.html.
"Electronic Paper Displays . . . What is an EPD", 2005, 1 page, internet document retrieved May 2008 from http://www.eink.com/technology/index.html.
Bonsor, Kevin, "How Electronic Ink Works", Oct. 11, 2000, HowStuffWorks.com, internet document retrieved on Nov. 16, 2011 from http://electronics.howstuffworks.com/gadgets/high-tech-gadgets/e-ink.htm.

* cited by examiner

*Primary Examiner* — Vijay Shankar
(74) *Attorney, Agent, or Firm* — Harrington & Smith

(57) ABSTRACT

Disclosed herein is an apparatus. The apparatus includes a housing, electronic circuitry, and an electronic component. The electronic circuitry is in the housing. The electronic circuitry includes a first capacitive connection pad. The electronic component is removably attached to an outer surface of the housing. The electronic component includes a second capacitive connection pad located opposite the first capacitive connection pad to form a capacitive connection between the electronic circuitry and the electronic component.

28 Claims, 4 Drawing Sheets

ELECTRONIC DEVICE WIRELESS DISPLAY

BACKGROUND OF THE INVENTION

1. Field of the Invention

The invention relates to an electronic device and, more particularly, to a wireless display for an electronic device.

2. Brief Description of Prior Developments

Decorative displays for electronic devices are known in the art. For example, Hitachi, Ltd. model W61H includes an external E Ink® display capable of showing different monochromatic patterns. However, the external display is limited in the number of different patterns for a user to select. As consumers demand increased customization capabilities for electronic devices, there is a continuing need to provide improved devices.

Additionally, the display is electrically connected to the device through an opening in the device housing allowing for electrical wiring and/or a physical electrical connector to extend therethrough. This configuration makes it difficult for a user to change the decorative display of the device. For example, if the user desires a new group or set of patterns to choose from, a skilled technician would likely be required to perform the operation of changing the decorative display of the device as conventional configurations comprise galvanic connections (a connector) for connecting the display to the phone electronics.

Other types of electrical connections, such as capacitive coupling connections for example, are also known in the art. U.S. Pat. No. 7,102,587 describes how an embedded antenna is connected with external circuitry (outside of the antenna embedding system). However, the capacitive coupling connection is limited to an antenna system and requires capacitive coupling pads placed on an exterior surface of the embedded antenna structure.

SUMMARY

In accordance with one aspect of the invention, an apparatus is disclosed. The apparatus includes a housing, electronic circuitry, and an electronic component. The electronic circuitry is in the housing. The electronic circuitry includes a first capacitive connection pad. The electronic component is removably attached to an outer surface of the housing. The electronic component includes a second capacitive connection pad located opposite the first capacitive connection pad to form a capacitive connection between the electronic circuitry and the electronic component.

In accordance with another aspect of the invention, an apparatus is disclosed. The apparatus includes a housing, electronic circuitry, and an electronic component. The electronic circuitry is in the housing. The electronic circuitry includes a first connection pad. The electronic component is removably connected to an outer surface of the housing. The electronic component includes a second connection pad inside the electronic component. The second connection pad is configured to be capacitively connected to the first connection pad. At least a portion of the housing is between the first connection pad and the second connection pad.

In accordance with another aspect of the invention, a method is disclosed. A housing is provided. Electronic circuitry is installed in the housing. The electronic circuitry includes a first connection pad. An electronic component removably attachable to an outer surface of the housing is provided. The electronic component includes a second capacitive connection pad located opposite the first capacitive connection pad to form a capacitive connection between the electronic circuitry and the electronic component.

In accordance with another aspect of the invention, a method is disclosed. A housing is provided. Electronic circuitry is installed in the housing. The electronic circuitry includes a first connection pad. An electronic component is removably connected to an outer surface of the housing. The electronic component includes a second connection pad inside the electronic component. The second connection pad is configured to be capacitively connected to the first connection pad. At least a portion of the housing is between the first connection pad and the second connection pad.

In accordance with another aspect of the invention, a method is disclosed. A voltage is applied through a capacitive connection between a thin film display and a device. The thin film display is removably mounted on an exterior surface of the device. The capacitive connection includes a first capacitive connection pad on a housing of the device and a second capacitive connection pad on the thin film display. A viewable image is provided on the thin film display in response to the applying of the voltage.

In accordance with another aspect of the invention, a program storage device readable by a machine, tangibly embodying a program of instructions executable by the machine for performing operations to change an image on a thin film display is disclosed. A desired display configuration of the thin film display is determined. The thin film display is removably mounted on an exterior surface of a device. A voltage is sent to an electrode of the thin film display through a capacitive connection. The voltage corresponds to the desired display configuration. The capacitive connection includes a first capacitive connection pad inside the device and a second capacitive connection pad on the thin film display.

BRIEF DESCRIPTION OF THE DRAWINGS

The foregoing aspects and other features of the invention are explained in the following description, taken in connection with the accompanying drawings, wherein.

DETAILED DESCRIPTION

Figure 1:
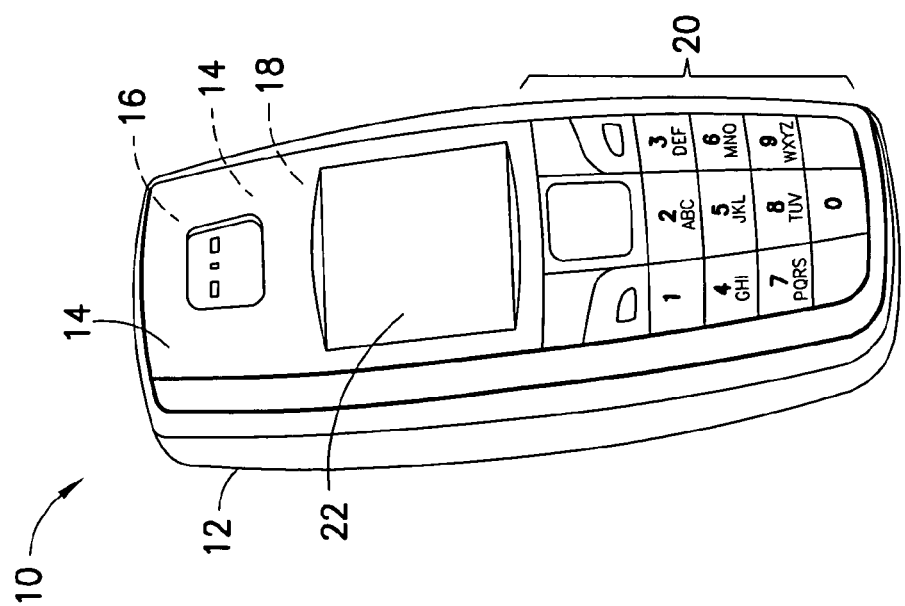
FIG. 1 is a perspective view of a front face of an electronic device incorporating features of the invention.

Referring to FIG. 1, there is shown a perspective view of an electronic device 10 incorporating features of the invention. Although the invention will be described with reference to the exemplary embodiment shown in the drawings, it should be understood that the invention can be embodied in many alternate forms of embodiments. In addition, any suitable size, shape or type of elements or materials could be used.

Figure 2:
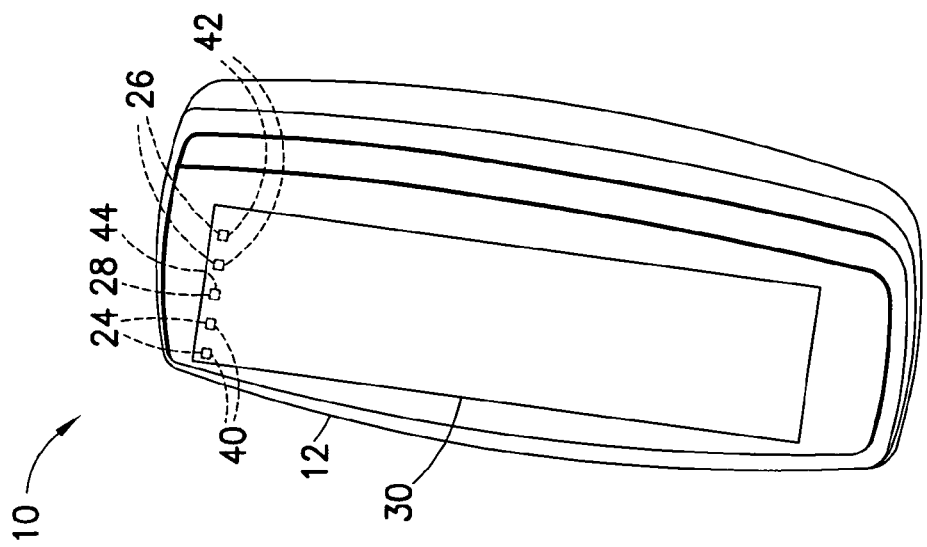
FIG. 2 is a perspective view of a back face of the electronic device shown in FIG. 1.

According to one example of the invention shown in FIGS. 1 and 2, the device 10 is a multi-function portable electronic device. However, in alternate embodiments, features of the various embodiments of the invention could be used in any suitable type of portable electronic device such as a mobile phone, a gaming device, a music player, a notebook computer, or a PDA, for example. In addition, as is known in the art, the device 10 can include multiple features or applications such as a camera, a music player, a game player, or an Internet browser, for example. The device 10 generally comprises a housing 12, a transceiver 14 connected to an antenna 16, electronic circuitry 18, such as a controller and a memory for example, within the housing 12, a user input region 20 and a display 22. The display 22 could also form a user input section, such as a touch screen. It should be noted that in alternate embodiments, the device 10 can have any suitable type of features as known in the art.

The electronic device 10 further comprises capacitive connection pads 24, 26, 28 and a thin film display 30 (see FIG. 2). The capacitive connection pads 24, 26, 28 may be mounted inside the housing 12 and be connected to the electronic circuitry 18. The capacitive connection pads 24, 26, 28 may be attached to an inner surface of the housing 12. However, the capacitive connection pads 24, 26, 28 may be disposed within the housing 12 in any suitable fashion. The thin film display 30 may be removably mounted on an exterior (or outer) surface the housing 12. It should be noted that although the figures illustrate the thin film display 30 at a back face of the electronic device 10, alternate embodiments may comprise the thin film display 30 at any suitable location. For example, the thin film display 30 may be provided at a front face or a lateral side face of the housing 12. In another example, the thin film display may be provided at a 'pocket' section of the device for example. Additionally, more than one thin film display may be provided.

Figure 3:
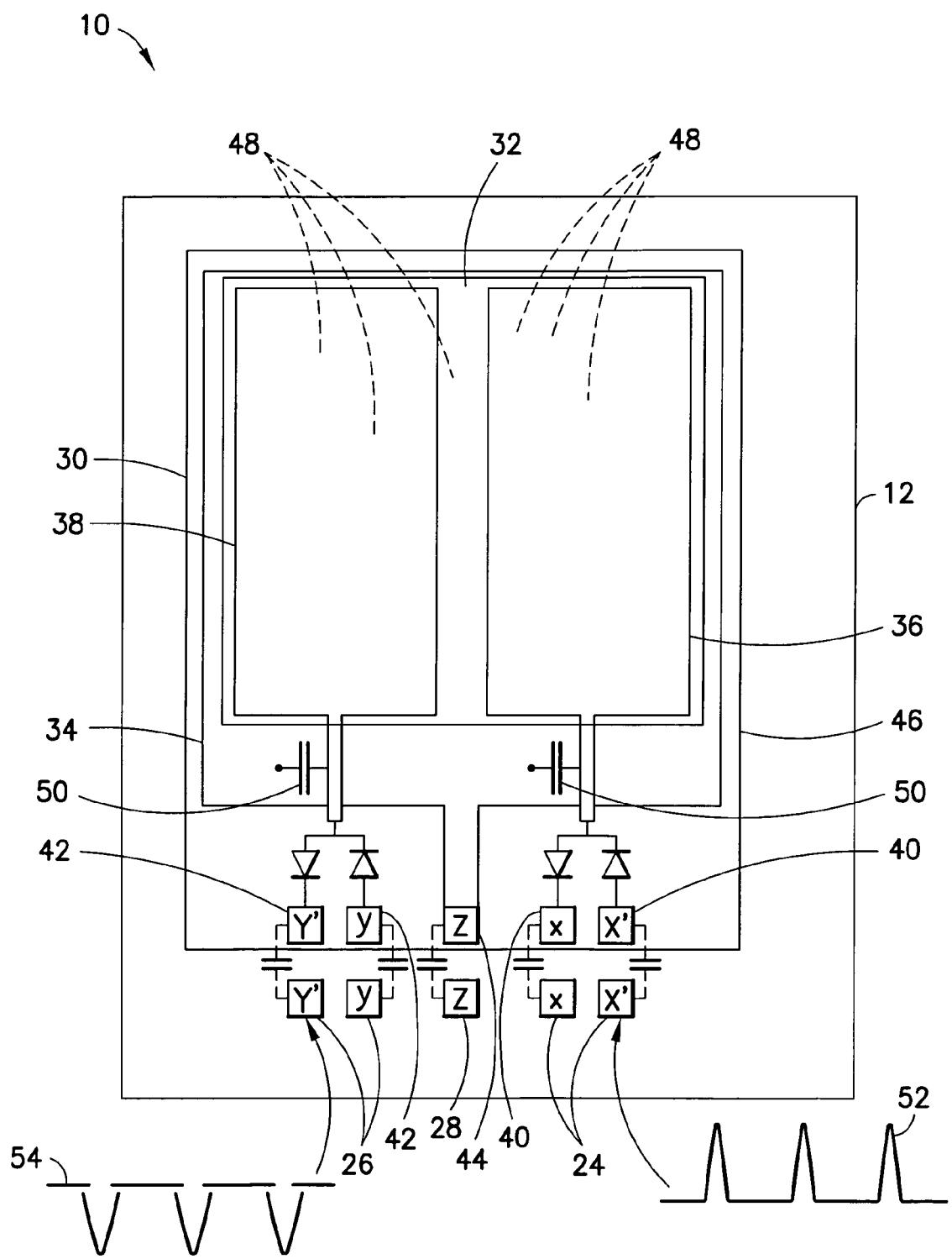
FIG. 3 is partial view of the electronic device shown in FIG. 1 further illustrating a thin film display.

Referring now also to FIG. 3, the thin film display 30 comprises an electronic ink material layer 32, a common electrode 34, decorative pattern segment electrodes 36, 38, capacitive connection pads 40, 42, 44, and a substrate 46. The thin film display 30 forms a wireless decorative display. The wireless decorative display 30 may communicate with the device 10 without a direct wire connection. This configuration allows for the wireless decorative display 30 to be attached and easily removed from the device 10, for example.

The electronic ink material layer 32 comprises microcapsules (or display capsules) 48 having electrically charged members therein. As is known in the art, the electrically charged members are configured to move in the capsule 48 when an electric field is generated. The electrically charged members may be positively and negatively charged particles for example. The positively charged particles may comprise a different color relative to the negatively charged particles. For example, the positively charged particles may comprise a black color or appearance and the negatively charged particles may comprise a white color or appearance. However, it should be noted that any suitable color or appearance may be provided.

When a positive electric field is applied, the black (positively charged) particles are moved to a top surface of the capsule 48 and the white (negatively charged) particles are moved to a bottom surface of the capsule 48. Similarly, when a negative electric field is applied, the white (negatively charged) particles are moved to the top surface of the capsule 48 and the black (positively charged) particles are moved to the bottom surface of the capsule 48.

The common electrode 34 extends along a bottom portion of the electronic ink material layer 32. The decorative pattern segment electrodes 36, 38 extend along a top portion of the electronic ink material layer 32. For example, the electronic ink material layer 32 may be provided between the common electrode 34 and the segment electrodes 36, 38 such that the bottom surface of the display capsules 48 are adjacent the common electrode 34 and the top surfaces of the display capsules 48 are adjacent the segment electrodes 36, 38. However, any suitable configuration may be provided.

The electrodes 34, 36, 38 may comprise a transparent (or translucent) conducting material, such as indium tin oxide for example. However, any suitable material may be provided. The transparent conducting material allows for a surface (such as the top surface) of the capsule 48 to be viewable through the electrodes (such as the segment electrodes for example).

The electrodes 34, 36, 38 are configured to provide (or generate) an electric field for interaction with the charged members of the electronic ink material layer 32. In one embodiment, capacitors 50 may be provided between the segment electrodes 36, 38 and the common electrode 34. However, alternate embodiments may provide the electrodes with no capacitors connected therebetween.

It should be noted that the electronic ink material layer 32 and the electrodes 34, 36, 38 may form any suitable type of electronic paper or electronic paper display as in known in the art. For example, the electronic ink material may be an E Ink® material provided by E Ink Corporation of Cambridge, Mass. for example. However, any suitable type of electronic ink material or electronic paper configuration may be provided.

The capacitive connection pads 40, 42, 44 are connected to the electrodes 34, 36, 38. In particular, the capacitive connection pad 44 is connected to the common electrode 34. The capacitive connection pads 40 are connected to the segment electrode 36. The capacitive connection pads 42 are connected to the segment electrode 38.

The substrate 46 forms a base supporting the electrodes 34, 36, 38 and the connection pads 40, 42, 44. The substrate 46 may comprise a transparent (or translucent) polymer or plastic material. In one embodiment, the substrate 46 may be formed as an adhesive tape for example. However, any suitable configuration may be provided. Additionally, the substrate 46 may comprise a plurality of layers. For example, one layer of the substrate may be attached to the common electrode 34 (and bottom sides of the connection pads) and another layer of the substrate may be attached to the segment electrodes 36, 38 (and top sides of the connection pads). This configuration provides for the electrodes 34, 36, 38, electronic ink material layer 32, and connection pads 40, 42, 44 to be embedded in the substrate 46. However, separate layers are not required. In one embodiment, the substrate may be a one piece member integrally formed (or overmolded) over the electrodes 34, 36, 38, the electronic ink material layer 32, and the connection pads 40, 42, 44. However, any suitable configuration may be provided.

According to various embodiments of the invention, the configuration of the capacitive connection pads 24, 26, 28, 40, 42, 44 allows for a connection between an external component 30 and the electronic circuitry 18 (or device processing engine) by capacitive coupling, which does not require any openings in the device housing 12. However, it should be noted that any suitable electric connection may be provided, such as an induction type connection, for example.

As illustrated in FIG. 2, the thin film display 30 is placed on the outer (or exterior) surface of the housing 12 such that capacitive connection pads 24, 26, 28, 40, 42, 44 are on top of each other (with the housing 12 therebetween). However, it should be noted that the conductive pads are not required to be directly over each other and may instead be laterally spaced from each other (with the housing 12 therebetween) as shown in FIG. 3. Additionally, the thin film display 30 may be formed in any suitable fashion, such as an adhesive tape configuration which allows a user to place and replace the same or different thin film displays on the device 10 for customization. In another alternative embodiment, the thin film display 30 may be formed with a magnetic connection configuration, which would also allow for a user to place and replace the same or different thin film displays on the device 10 for customization. However, any suitable configuration which allows for attaching and re-attaching the thin film display 30 to the housing 12 may be provided.

Placing the thin film display 30 on the outer surface of the housing 12, wherein the capacitive connection pads 40, 42, 44 are proximate the capacitive connection pads 24, 26, 28 forms a capacitive connection between the electronic device 10 and the thin film display 30. In particular, the connection pads 40, 42, 44 form a capacitive connection with the connection pads 24, 26, 28 allowing a voltage to be applied therethrough. For example, the electronic circuitry 18 may be configured to drive (or apply) positive or negative voltage pulses 52, 54 to the connecting pads 24, 26, 28 in the housing 12. Capacitive coupling between the connecting pads 24, 26, 28 and the connecting pads 40, 42, 44 allows the positive or negative voltage pulses 52, 54 (from the electronic device 10) to be applied through the connection pads 40, 42, 44 and to the electrodes 34, 36, 38.

For example, when a negative voltage 54 is applied through the capacitive connection (between the connection pads 26 and 42), the segment electrode (or segment ITO) 38 will be driven to a negative voltage relative to the common electrode (or common ITO) 34 which provides a white appearance at the surface of the substrate 46. The white appearance is provided as the white negatively charged members are moved (under electromagnetic field interactions between the electrodes 34, 38 and the charged members) to the top surface of the capsules 48 and are viewable through the transparent segment electrode 38 and the transparent substrate 46. Similarly, a black appearance may be provided at the surface of the substrate 46 when positive pulses are provided the connection pads 26. Additionally, after the pulsing stops, the electronic ink material layer 32 may maintain the displayed state.

For example, when a positive voltage 52 is applied through the capacitive connection (between the connection pads 24 and 40), the segment electrode (or segment ITO) 36 will be driven to a positive voltage relative to the common electrode (or common ITO) 34 which provides a black appearance at the surface of the substrate 46. The black appearance is provided as the black positively charged members are moved (under electromagnetic field interactions between the electrodes 34, 36 and the charged members) to the top surface of the capsules 48 and are viewable through the transparent segment electrode 36 and the transparent substrate 46. Similarly, a white appearance may be provided at the surface of the substrate 46 when negative pulses are provided the connection pads 24. Additionally, after the pulsing stops, the electronic ink material layer 32 may maintain the displayed state.

It should be noted that in alternate embodiments, the black appearance and the white appearance may be provided with the application of just a single voltage. For example, a negative voltage may be applied to provide a white appearance (as described above), and a 'default' appearance (which may be a black appearance, for example) may be provided when no voltage is applied. Similarly, a positive voltage may be applied to provide a black appearance (as described above), and a 'default' appearance (which may be a white appearance, for example) may be provided when no voltage is applied. In another alternative embodiment, a negative voltage may be applied to provide a white appearance (as described above), a positive voltage may be applied to provide a black appearance (as described above), and a 'default' appearance (which may be another different color other than a white or black color appearance, for example) may be provided when no voltage is applied.

Additionally, it should be noted that any suitable colors other than black or white may be provided. For example, the charged members may provide a red color, a blue color, or a green color. However, these are merely examples, and any suitable color may be provided. It should further be understood that although the description above provides for a color/appearance to be displayed after a voltage (or no voltage) is applied, various embodiments may provide any suitable appearance. For example, the capsules may be arranged to provide different images based upon one or more colors provided by the individual capsules. Additionally, any suitable pictures, patterns, or designs, may be provided at the thin film display.

The voltages 52, 54 for driving the charged particles in the electronic ink material layer 32 may be about 10 volts (about +10 or about −10 volts depending on waveform of drive signal). However, any suitable voltage may be provided.

Various exemplary embodiments of the invention provide advantages over conventional configurations. For example, conventional matrix displays are generally too complicated to produce low cost decorative displays and segmented (or pre-patterned) displays comprise galvanic connections (a connector) for connecting the display to the phone electronics. These conventional configurations may make it difficult for users to change to another pattern or group of patterns. Various exemplary embodiments of the invention provide easy changeability between different displays since no physical connector is needed. The new group of decorative patterns may be included in replacement thin film display which may have a sticker-type add-on film configuration, which may be simply placed on the phone cover (or outer surface of the device housing).

Figure 4:
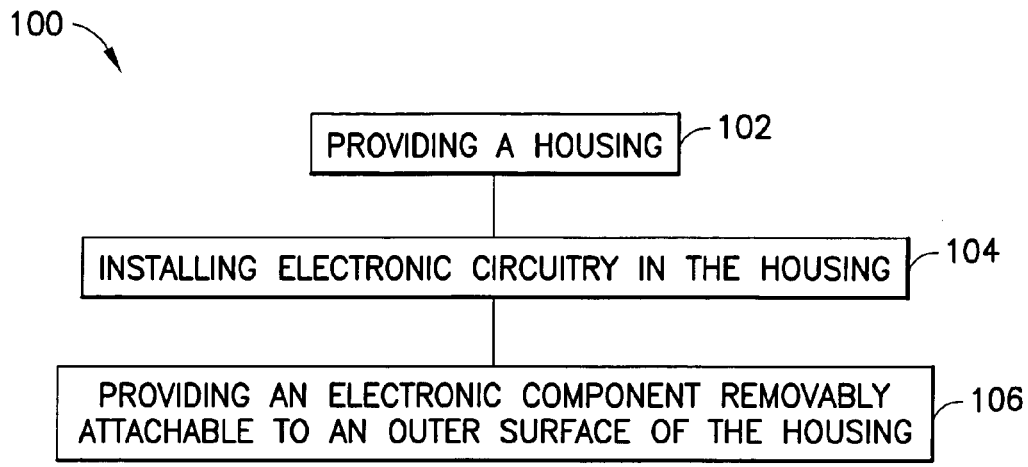
FIG. 4 is a block diagram of an exemplary method of manufacturing the electronic device shown in FIG. 1.

FIG. 4 illustrates a method 100 of manufacturing the electronic device. The method includes the following steps. Providing a housing (step 102). Installing electronic circuitry in the housing, wherein the electronic circuitry comprises a first capacitive connection pad (step 104). Providing an electronic component removably attachable to an outer surface of the housing, wherein the electronic component comprises a second capacitive connection pad located opposite the first capacitive connection pad to form a capacitive connection between the electronic circuitry and the electronic component (step 106). It should be noted that any of the above steps may be performed alone or in combination with one or more of the steps.

Figure 5:
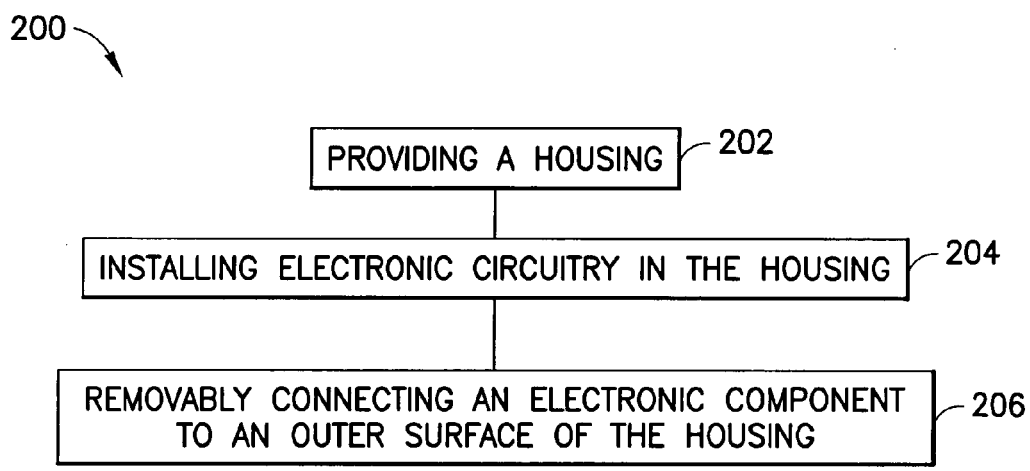
FIG. 5 is a block diagram of another exemplary method of manufacturing the electronic device shown in FIG. 1.

FIG. 5 illustrates a method 200 of manufacturing the electronic device. The method includes the following steps. Providing a housing (step 202). Installing electronic circuitry in the housing, wherein the electronic circuitry comprises a first connection pad (step 204). Removably connecting an electronic component to an outer surface of the housing, wherein the electronic component comprises a second connection pad inside the electronic component, wherein the second connection pad is configured to be capacitively connected to the first connection pad, and wherein at least a portion of the housing is between the first connection pad and the second connection pad (step 206). It should be noted that any of the above steps may be performed alone or in combination with one or more of the steps.

Figure 6:
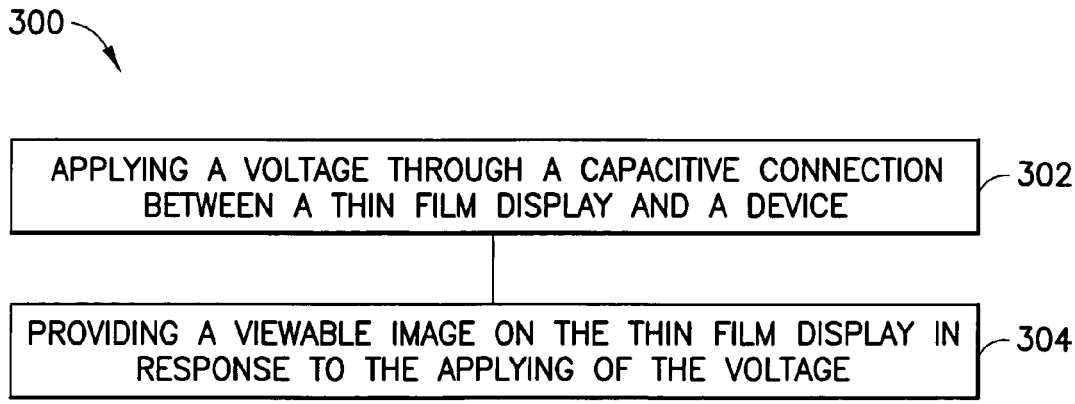
FIG. 6 is a block diagram of an exemplary method of the electronic device shown in FIG. 1.

FIG. 6 illustrates a method 300. The method includes the following steps. Applying a voltage through a capacitive connection between a thin film display and a device, wherein the thin film display is removably mounted on an exterior surface of the device, wherein the capacitive connection comprises a first capacitive connection pad on a housing of the device and a second capacitive connection pad on the thin film display (step 302). Providing a viewable image on the thin film display in response to the applying of the voltage (step 304). It should be noted that any of the above steps may be performed alone or in combination with one or more of the steps.

Figure 7:
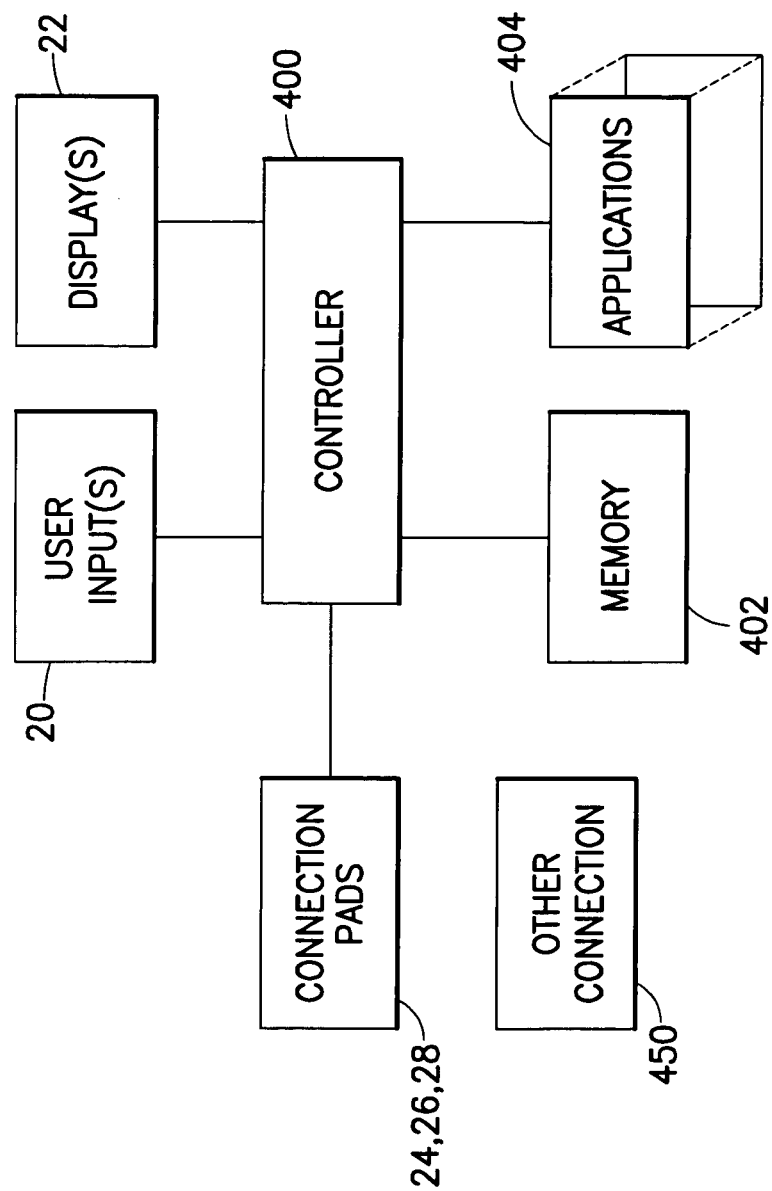
FIG. 7 is a schematic drawing illustrating components of the portable electronic device shown in FIG. 1.

Referring now also to FIG. 7, the device 10 generally comprises a controller 400 such as a microprocessor for example. The electronic circuitry includes a memory 402 coupled to the controller 400, such as on a printed circuit board for example. The memory could include multiple memories including removable memory modules for example. The device has applications 404, such as software, which the user can use. The applications can include, for example, a telephone application, an Internet browsing application, a game playing application, a digital camera application, etc. These are only some examples and should not be considered as limiting. One or more user inputs 20 are coupled to the controller 400 and one or more displays 22 are coupled to the controller 400. The connection pads 24, 26, 28 are also coupled to the controller 400. However, it should be noted that the capacitive connection pads are not required and that other connections 450 may be provided. For example, the other connections 450 may include an induction type connection, for example. However, this is merely one alternative example and the other connections 450 may comprise any suitable electrical connection configurations which do not require direct electrical wiring between the thin film display and the device housing 12. The device 10 may programmed to automatically change a view or an image on the thin film display 30. However, in an alternate embodiment, this might not be automatic. The user might need to actively select a change of the image viewable on the thin film display 30.

Embodiments of the invention provide a wireless decorative electronic ink (or electronic paper) display 30. However, it should be noted that alternate embodiments may provide for connection of any suitable type of components outside of the device housing.

Various exemplary embodiments of the invention provide advantages over conventional configurations having physical connectors which require an opening (or openings) in the housing of the device for electrical wiring or connectors to extend therethrough.

Embodiments of the invention provide for capacitive coupling instead of galvanic connection(s). The electrical signal is connected to the decorative film display thru the connection pads, which are placed close to each other (one set of connection pads in the device and another set of connection pads in the thin film display), but still isolated from each other (for example, the connection pads in the device and the set of connection pads in the thin film display are free of electrical wiring or physical electrical connectors therebetween). By signal form control, it is possible to create either positive or negative voltage in the film electronics to change the viewable image on the thin film display.

Additionally, embodiments of the invention provide for an improved display configuration for an electronic device having simple attachment, thinness and low cost. The thin film display may have any suitable dimensions. For example, the thin film display may comprise dimensions in the range of a few centimeters by a few centimeters and a thickness of about 0.1 to about 0.5 mm.

Further advantages may be provided by the various embodiments of the invention having capacitive coupling between component(s) outside of the housing and the device engine inside of the housing. The capacitive connection is simple and the attached component (for example, the thin film display) is easy to replace. Replacement of the component (thin film display) may be performed without opening the device housing or using physical connectors. The replaceable thin film display is advantageous as not all users desire the same customization options (such as a limited number of patterns to choose from). The device is also protected from extra dirt as there is no opening in the housing for the (capacitive) connection.

According to one example of the invention, an apparatus is disclosed. The apparatus includes the following elements. A housing, electronic circuitry, and an electronic component. The electronic circuitry is in the housing. The electronic circuitry includes a first capacitive connection pad. The electronic component is removably attached to an outer surface of the housing. The electronic component includes a second capacitive connection pad located opposite the first capacitive connection pad to form a capacitive connection between the electronic circuitry and the electronic component.

According to another example of the invention, an apparatus is disclosed. The apparatus includes the following elements. A housing, electronic circuitry, and an electronic component. The electronic circuitry is in the housing. The electronic circuitry includes a first connection pad. The electronic component is removably connected to an outer surface of the housing. The electronic component includes a second connection pad inside the electronic component. The second connection pad is configured to be capacitively connected to the first connection pad. At least a portion of the housing is between the first connection pad and the second connection pad.

According to another example of the invention, a program storage device is disclosed. The program storage device may perform the following operations. Determining a desired display configuration of the thin film display, wherein the thin film display is removably mounted on an exterior surface of a device. Sending a voltage to an electrode of the thin film display through a capacitive connection, wherein the voltage corresponds to the desired display configuration, and wherein the capacitive connection comprises a first capacitive connection pad inside the device and a second capacitive connection pad on the thin film display.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus comprising:
    a housing;
    electronic circuitry in the housing, wherein the electronic circuitry comprises a first connection pad; and
    a thin film display removably connected to an outer surface of the housing, wherein the thin film display is configured for user input or output, wherein the thin film display comprises a second connection pad inside the thin film display, wherein the second connection pad is configured to be capacitively connected to the first connection pad, and wherein at least a portion of the housing is between the first connection pad and the second connection pad.

2. The apparatus of claim 1 wherein the first connection pad is a first capacitive connection pad, and wherein the first capacitive connection pad is entirely inside the housing.

3. The apparatus of claim 1 wherein the second connection pad is opposite the first connection pad with the housing therebetween.

4. The apparatus of claim 1 wherein the thin film display comprises microcapsules of electrically charged members.

5. The apparatus of claim 4 wherein the electrically charged members are configured to form a viewable image on a surface of the thin film display.

6. The apparatus of claim 1 wherein the first and the second connection pads are capacitive connection pads free of electrical wiring therebetween.

7. The apparatus of claim 1 wherein the second connection pad is embedded in a substrate of the thin film display.

8. The apparatus of claim 1 wherein the second connection pad is connected to an electrode of the thin film display.

9. The apparatus of claim 1 wherein at least a portion of the thin film display is between the first connection pad and the second connection pad.

10. The apparatus of claim 1 wherein the thin film display is configured to receive a voltage applied through the first and second connection pads.

11. A method comprising:
providing a housing;
installing electronic circuitry in the housing, wherein the electronic circuitry comprises a first capacitive connection pad; and
providing a thin film display removably attachable to an outer surface of the housing, wherein the thin film display is configured for user input or output, and wherein the thin film display comprises a second capacitive connection pad located opposite the first capacitive connection pad to form a capacitive connection between the electronic circuitry and the thin film display.

12. The method of claim 11 further comprising mounting the first connection pad to an inside surface of the housing.

13. The method of claim 1 further comprising mounting the second connection pad inside the thin film display.

14. A method comprising:
providing a housing;
installing electronic circuitry in the housing, wherein the electronic circuitry comprises a first connection pad; and
removably connecting a thin film display to an outer surface of the housing, wherein the thin film display is configured for user input or output, wherein the thin film display comprises a second connection pad inside the thin film display, wherein the second connection pad is configured to be capacitively connected to the first connection pad, and wherein at least a portion of the housing is between the first connection pad and the second connection pad.

15. The method of claim 14 further comprising mounting the second connection pad to a substrate of the thin film display.

16. The method of claim 14 further comprising connecting the second connection pad to an electrode of the thin film display.

17. A method comprising:
applying a voltage through a capacitive connection between a thin film display and a device, wherein the thin film display is removably mounted on an exterior surface of the device, wherein the thin film display is configured for user input or output, and wherein the capacitive connection comprises a first capacitive connection pad on a housing of the device and a second capacitive connection pad on the thin film display; and
providing a viewable image on the thin film display in response to the applying of the voltage.

18. The method of claim 17 further comprising providing another viewable image on the thin film display in response to applying of another voltage.

19. The method of claim 17 wherein the applying of the voltage through the capacitive connection further comprises applying the voltage through the first capacitive connection pad inside the housing and the second capacitive connection pad in the thin film display.

20. A program storage device readable by a machine, tangibly embodying a program of instructions executable by the machine for performing operations to change an image on a thin film display, the operations comprising:
determining a desired display configuration of the thin film display, wherein the thin film display is removably mounted on an exterior surface of a device, wherein the thin film display is configured for user input or output; and
sending a voltage to an electrode of the thin film display through a capacitive connection, wherein the voltage corresponds to the desired display configuration, and wherein the capacitive connection comprises a first capacitive connection pad inside the device and a second capacitive connection pad on the thin film display.

21. A communications apparatus comprising:
a housing;
electronic circuitry in the housing, wherein the electronic circuitry comprises a first capacitive connection pad; and
a thin film display removably attached to an outer surface of the housing, wherein the thin film display is configured for user input or output, and wherein the thin film display comprises a second capacitive connection pad located opposite the first capacitive connection pad to form a capacitive connection between the electronic circuitry and the thin film display.

22. The apparatus of claim 21 wherein the thin film display comprises an electronic ink material layer.

23. The apparatus of claim 21 wherein the first capacitive connection pad is completely inside the housing.

24. The apparatus of claim 23 wherein the second capacitive connection pad is inside the thin film display, and wherein the second capacitive connection pad is opposite the first capacitive connection pad with the housing therebetween.

25. The apparatus of claim 21 wherein the thin film display comprises microcapsules of positively and negatively charged particles.

26. The apparatus of claim 21 wherein the apparatus further comprises a third capacitive connection pad connected to the electronic circuitry and a fourth capacitive connection pad connected to the thin film display, wherein the third capacitive connection pad is inside the housing, and wherein the fourth capacitive connection pad is inside the thin film display.

27. The apparatus of claim 21 wherein the second capacitive connection pad is embedded in a substrate of the thin film display.

28. The apparatus of claim 27 wherein the first capacitive connection pad is mounted to an inner surface of the housing.

* * * * *